United States Patent
Furukawa et al.

[19]

[11] Patent Number: 5,886,496
[45] Date of Patent: Mar. 23, 1999

[54] TILT SERVO CONTROLLING APPARATUS

[75] Inventors: Junichi Furukawa; Kiyoshi Tateishi; Noriaki Murao, all of Tsurugashima, Japan

[73] Assignee: Pioneer Electronic Corporation, Tokyo-to, Japan

[21] Appl. No.: 61,865

[22] Filed: Apr. 17, 1998

[30] Foreign Application Priority Data

Apr. 18, 1997 [JP] Japan ................................. 9-102122
Mar. 20, 1998 [JP] Japan ................................. 10-092617

[51] Int. Cl.$^6$ ................................................. B64C 17/02
[52] U.S. Cl. .......................... 318/648; 318/638; 318/640; 318/641; 369/109
[58] Field of Search ..................... 318/648, 638, 318/640, 641; 369/109, 118, 44.14

[56] References Cited

U.S. PATENT DOCUMENTS

| | | | |
|---|---|---|---|
| 5,302,834 | 4/1994 | Murao | 369/44.14 X |
| 5,322,993 | 6/1994 | Ohyama | 369/118 |
| 5,751,680 | 5/1998 | Ishibashi et al. | 369/109 X |

*Primary Examiner*—Karen Masih
*Attorney, Agent, or Firm*—Young & Thompson

[57] ABSTRACT

A tilt servo controlling apparatus is provided with: an optical pickup for emitting a light beam onto an optical record medium and detecting a reflection light from the optical record medium to thereby output a detection signal; a level detecting device for detecting a level of the detection signal outputted by the optical pickup; a tilt error correcting device for correcting a tilt error due to an aberration, which is generated by a tilt angle between (i) a normal line of a surface of the optical record medium at a position irradiated with the light beam and (ii) an optical axis of the light beam; and a tilt error correction controlling device for outputting a control signal to control a correction amount of the tilt error correcting device, by giving a variation to the control signal on a time base and adjusting the control signal so that the level detected by the level detecting device be optimized with respect to the variation of the control signal.

9 Claims, 18 Drawing Sheets

TILT SERVO CONTROLLING APPARATUS

BACKGROUND OF THE INVENTION

1. Field of the Invention

The present invention relates to a tilt servo controlling apparatus for correcting a tilt error of an optical disc.

2. Description of the Related Art

In the technical field of an optical disc such as a CD (Compact Disc), a DVD or the like, there is a problem that an angle between an optical axis of a light beam emitted by an optical pickup and a surface of the optical disc at an irradiation position (i.e., a tilt angle) is shifted from a perpendicular angle, due to a distortion or a surface deflection of the optical disc. The tilt angle is generated mainly in a radial direction of the optical disc and becomes a factor of a comma aberration of the optical system, which gives a harmful influence onto a reproduction quality of the optical disc since it causes a cross talk between adjacent tracks and a deterioration of a jitter. Further, if a high density recording is attempted such as a DVD, since the spot diameter of the laser beam becomes small, it is necessary to shorten the wavelength $\lambda$ of the laser beam and enlarge a numerical aperture of an objective lens, so that a margin with respect to the tilt angle becomes small. Namely, even if the optical disc is tilted in a very small degree, a large deterioration in the reproduction quality is generated. Therefore, in order to correct the aberration due to the tilt angle during the reproducing operation of the optical disc, there are installed (i) a tilt sensor including a light source of an exclusive light beam to detect the tilt angle and a detector to detect the exclusive light beam, and (ii) a mechanism for controlling the inclination of the optical pickup in correspondence with the detected tilt angle, so as to apply the tilt servo control.

However, according to the above explained tilt servo control, the tilt sensor, which has a detector and a light source to emit a pair of light beams, is necessary besides the optical pickup, and a complicated mechanical portion to control the tilt of the optical pickup is necessary. This leads to the cost up and makes it difficult to miniaturize the apparatus since it occupies a certain space.

SUMMARY OF THE INVENTION

It is therefore an object of the present invention to provide a tilt servo controlling apparatus for an optical record medium such as an optical disc, which can improve a reproduction quality by correcting the tilt error, and which has a rather simple construction and is suitable for miniaturization.

The above object of the present invention can be achieved by a tilt servo controlling apparatus provided with: an optical pickup for emitting a light beam onto an optical record medium and detecting a reflection light from the optical record medium to thereby output a detection signal; a level detecting device for detecting a level of the detection signal outputted by the optical pickup; a tilt error correcting device for correcting a tilt error due to an aberration, which is generated by a tilt angle between (i) a normal line of a surface of the optical record medium at a position irradiated with the light beam and (ii) an optical axis of the light beam; and a tilt error correction controlling device for outputting a control signal to control a correction amount of the tilt error correcting device, by giving a variation to the control signal on a time base and adjusting the control signal so that the level detected by the level detecting device be optimized with respect to the variation of the control signal.

According to the tilt servo controlling apparatus, the light beam is emitted onto the optical record medium, the reflection light from the optical record medium is detected, and the detection signal is outputted by the optical pickup. Along with this, the level of the detection signal outputted by the optical pickup is detected by the level detecting device. During these operations in the actual cases, the aberration is generated by a tilt angle between (i) the normal line of the surface of the optical record medium at the position irradiated with the light beam and (ii) the optical axis of the light beam. The tilt error due to this aberration is corrected by the tilt error correcting device under the control of the tilt error correction controlling device. Namely, the correction amount of the tilt error correcting device is controlled by the control signal outputted by the tilt error correction controlling device. At this time, a variation is given to the control signal on a time base, and the control signal is adjusted so that the level detected by the level detecting device be optimized with respect to the variation of the control signal. Thus, when the tilt error is generated, although the level of the detection signal of the optical pickup tends to decrease, by the above described servo operation of the tilt error correcting device under the control of the tilt error correction controlling device, this tilt error can be compensated. Therefore, it is possible to prevent the deterioration of the reproduction quality due to the tilt error. Consequently, it is possible to perform the tilt servo control without a tilt sensor as in the aforementioned conventional case.

In this way, the tilt servo control apparatus can be realized, which improves the reproduction quality, which has a rather simple structure and is suitable for the miniaturization.

In one aspect of the tilt servo controlling apparatus, the tilt error correction controlling device generates two kinds of disturbances as the control signal, compares levels with each other which are detected by the level detecting device in correspondence with the two kinds of disturbances, and increases or decreases the control signal by a predetermined amount so that the level detected by the level detecting device approaches a maximum value thereof.

According to this aspect, two kinds of disturbances are generated as the control signal by the tilt error correction controlling device. Along with this, the levels, which are detected by the level detecting device in correspondence with the two kinds of disturbances, are compared with each other by the tilt error correction controlling device. Then, the control signal is increased or decreased by a predetermined amount so that the level detected by the level detecting device approaches a maximum value (i.e. a peak value) thereof, by the tilt error correction controlling device. In accordance with this control signal, the tilt error is corrected by the tilt error correcting device. Namely, a so-called "mountain climbing control" is performed by the tilt error correcting device under the control of the tilt error correction controlling device. Consequently, it is possible to perform the tilt servo control by use of a simple structure without a tilt sensor.

In another aspect of the tilt servo controlling apparatus, the tilt error correcting device is provided with a liquid crystal panel disposed on an optical axis of the light beam for correcting an aberration, and the tilt error correction controlling device outputs the control signal as a driving signal for the liquid crystal panel.

According to this aspect, under the control of the tilt error correction controlling device, the tilt error is corrected by the liquid crystal panel on the optical axis of the light beam.

Consequently, it is possible to reliably perform the tilt servo control by use of a simple structure without a tilt sensor, and that a mechanism for controlling the inclination of the optical pickup is not necessary for the tilt servo control.

In this aspect including the liquid crystal panel, a surface area of the liquid crystal panel may be divided into three areas of an inner circumference side area, a center area and an outer circumference side area with respect to a radial direction of an optical disc as the optical record medium, so that the liquid crystal panel be driven by the control signal for each of the three areas independently from each other. Thus, the tilt error is corrected by driving each of the three areas of the liquid crystal panel independently from each other by the control signal.

In this aspect including the liquid crystal panel, the control signal of the tilt error correction controlling device may be limited so that a width of the variation of the control signal may not exceed a predetermined upper limit. Thus, even if the detection signal of the optical pickup has two peaks with respect to the tilt angle i.e., a genuine peak corresponding to the maximum value and a pseudo peak at a tilt angle shifted from that for the genuine peak, the tilt servo control can keep up with the genuine peak with respect to which the servo control is to be applied, so that the stable tilt servo control can be performed.

In this aspect including the liquid crystal panel, the tilt servo controlling apparatus may be further provided with a temperature detecting device for detecting an ambient temperature of the liquid crystal panel, the tilt error correction controlling device changing a frequency of the control signal on the basis of the ambient temperature detected by the temperature detecting device. Thus, since the frequency of the control signal is changed on the basis of the ambient temperature, it is possible to keep up with the change of the disturbances applied as the control signal, at a relatively low temperature when the response speed of the liquid crystal panel becomes low, so that the reproduction quality can be further improved, and the more stable tilt servo control can be performed.

In another aspect of the tilt servo controlling apparatus, the level detecting device comprises an AGC (Automatic Gain Control) amplifier for controlling a level of the detection signal outputted by the optical pickup to be constant, and a gain control signal of the AGC amplifier is used as the level of the detection signal outputted by the optical pickup.

According to this aspect, while the detection signal is outputted by the optical pickup, a level of the detection signal outputted by the optical pickup is controlled to be constant by the AGC amplifier. Then, the correction amount of the tilt error correcting device is controlled by the control signal based on the gain control signal of the AGC amplifier, which corresponds to the level of the detection signal of the optical pickup. Therefore, it is not necessary to exclusively install the level detecting device for detecting the level of the detection signal of the optical pickup but the AGC amplifier can be commonly used as the level detecting device. In this way, the tilt servo control apparatus can be realized, which improves the reproduction quality, which has a rather simple structure and is suitable for the miniaturization.

In another aspect of the tilt servo controlling apparatus, the apparatus is further provided with a frequency signal generating device for generating a frequency signal in synchronization with a rotation of a spindle motor for rotating the optical record medium, the tilt error correction controlling device controlling a timing of generating the control signal on the basis of the frequency signal generated by the frequency signal generating device.

According to this aspect, while the optical record medium is rotated by the spindle motor, a frequency signal in synchronization with the rotation of the spindle motor is generated by the frequency signal generating device. Then, on the basis of this frequency signal, the timing of generating the control signal is controlled by the tilt error correction controlling device. Thus, even if the variation in the amplitude synchronized with the rotation of the optical record medium due to the influence of the surface deflection etc. is included in the detection signal of the optical pickup, it is still possible to search the driving voltage in the direction to increase the detection signal of the optical pickup, so that the stable tilt servo control can be performed.

In another aspect of the tilt servo controlling apparatus, a frequency of the control signal may be set by the tilt error correction controlling device such that an even number times of the frequency of the control signal is synchronized with a rotation cycle of a spindle motor for rotating the optical record medium.

According to this aspect, while the optical record medium is rotated by the spindle motor, an even number times of the frequency of the control signal is synchronized with the rotation cycle of the spindle motor. Then, by the control signal having such a frequency, the tilt error correcting device is controlled. Thus, even if the variation in the amplitude synchronized with the rotation of the optical record medium due to the influence of the surface deflection etc. is included in the detection signal of the optical pickup, it is still possible to surely and precisely search the driving voltage in the direction to increase the detection signal of the optical pickup, so that the stable tilt servo control can be performed.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Referring to the accompanying drawings, embodiments of the present invention will be now explained.

(1) First Embodiment

At first, a first embodiment of the present invention is explained with reference to FIGS. 1 to 10.

Figure 1:
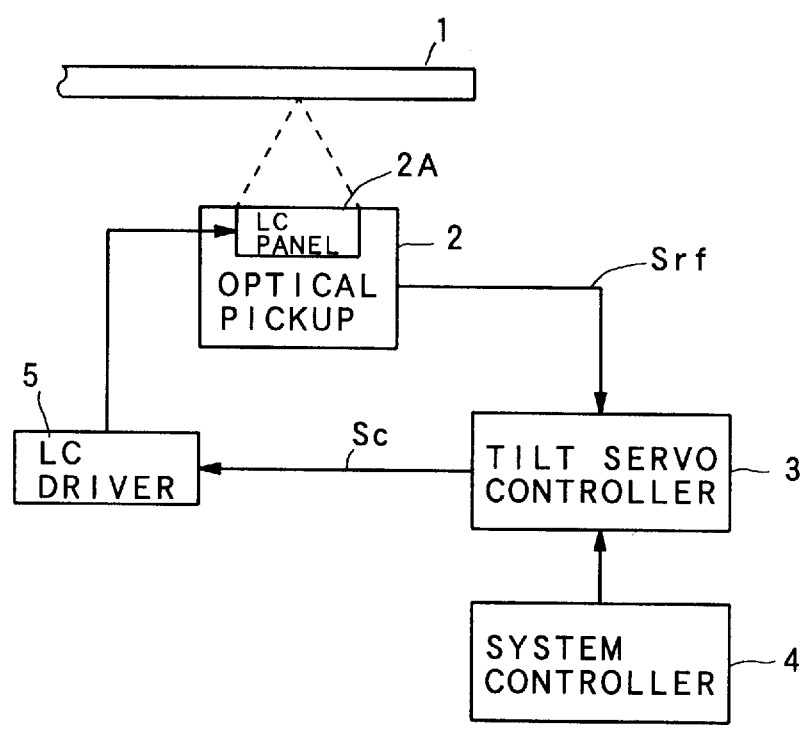
FIG. 1 is a block diagram of a tilt servo controlling apparatus as a first embodiment of the present invention.

In FIG. 1, a tilt servo controlling apparatus as a first embodiment of the present invention is provided with: an optical disc 1; an optical pickup 2 including a liquid crystal (LC) panel 2A; a tilt servo controller 3; a system controller 4; and a liquid crystal (LC) driver 5.

The optical pickup 2 is constructed to emit a light beam onto the optical disc 1, detect the reflected light beam from the optical disc 1 and output an RF (Radio Frequency) signal Srf as a detection signal. In the optical pickup 2, the liquid crystal panel 2A is disposed on an optical axis of the light beam, and the aberration of the optical system can be corrected by the liquid crystal panel 2A. The operation of the liquid crystal panel 2A will be described later in detail. The RF signal outputted from the optical pickup 2 is inputted to the tilt servo controller 3, so that the tilt servo control is appropriately performed in correspondence with the amplitude level of the RF signal. In order to correct the tilt error, the tilt servo controller 3 outputs a data control signal Sc, which is PWM (Pulse Width Modulation)—modulated, to the liquid crystal driver 5 for applying a voltage to the liquid crystal panel 2A so as to driving the liquid crystal panel 2A. As a result, the liquid crystal panel 2A can change the phase difference of the light beam passing through the liquid crystal panel 2A, to thereby function as one example of the tilt error correcting device for correcting the aberration. On the other hand, the system controller 4 controls the tilt servo controller 3. The system controller 4 adjusts the tilt error correction amount while applying an external disturbance to the control signal Sc to appropriately perform the tilt servo control. The tilt servo controller 3 and the system controller 4 in one body function as one example of the tilt error correction controlling device. The detailed operation of the tilt servo control will be described later in detail.

Next, the structure of the liquid crystal panel 2A is explained with reference to FIGS. 2A to 2C.

Figure 2A:
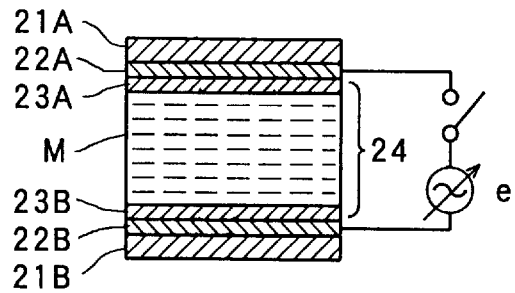
FIG. 2A is a schematic sectional view showing a structure of a liquid crystal panel in one condition in the first embodiment.
Figure 2B:
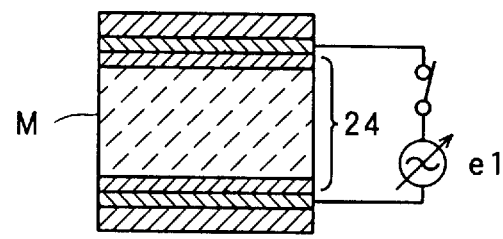
FIG. 2B is a schematic sectional view showing the structure of the liquid crystal panel in another condition in the first embodiment.
Figure 2C:
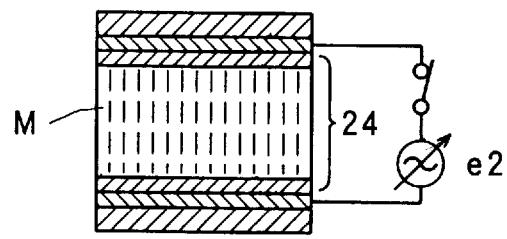
FIG. 2C is a schematic sectional view showing the structure of the liquid crystal panel in another condition in the first embodiment.

In each of FIGS. 2A to 2C, the liquid crystal panel 2A is provided with: transparent glass substrates 21A and 21B opposed to each other; transparent electrodes 22A and 22B vapor-deposited on the inner surfaces of the glass substrates 21A and 21B respectively; orientation films 23A and 23B formed on the inner surfaces of the transparent electrodes 22A and 22B respectively; and a liquid crystal 24 having a birefringence, which is interposed and sealed between the orientation films 23A and 23B.

The direction of the liquid crystal molecules M of the liquid crystal 24 is freely changed from the horizontal direction to the vertical direction in accordance with the voltage applied by the transparent electrodes 22A and 22B, as shown in FIGS. 2A to 2B, in this order. Therefore, by the birefringence effect of the liquid crystal molecules M, an optical path difference $\Delta n \cdot d$ ($\Delta n$: change in the refraction factor, d: cell thickness of the liquid crystal 24) is given to the light beam passing through the liquid crystal 24 by the change in the refraction factor. Namely, it is possible to give a phase difference $\Delta n \cdot d (2\pi/\lambda)$ ($\lambda$: wavelength of the light beam) to the light beam passing through the liquid crystal 24.

Figure 2D:
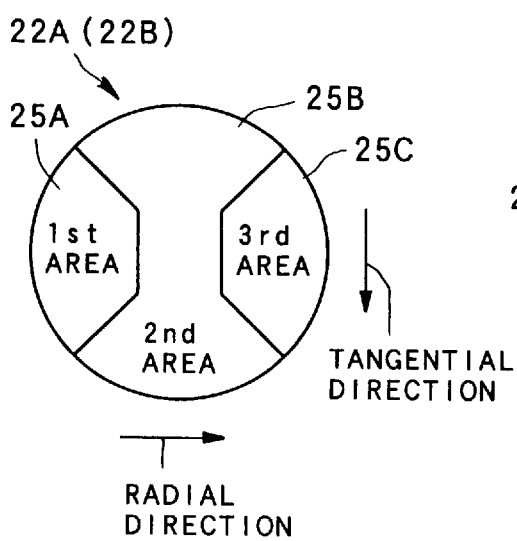
FIG. 2D is a schematic plan view showing the structure of the liquid crystal panel in the first embodiment.

In FIG. 2D, which is a schematic plan view of the liquid crystal panel 2A for correcting the aberration in the radial direction, each of the transparent electrodes 22A and 22B is divided into three areas i.e., a $1^{st}$ area 25A at the inner circumference side, a $2_{nd}$ area 25B at a central side and a $3^{rd}$ area at the outer circumference side with respect to the radial direction. Then, as the $1^{st}$ to $3^{rd}$ areas 25A to 25C are controlled independently by the driving voltages independent from each other, the phase difference of the light beam passing through each division area can be independently changed, so that the comma aberration and the like due to the tilt generated in the radial direction can be corrected.

Incidentally, the appropriate correction amount as for the tilt angle in the radial direction (hereinbelow, it is referred to as a "radial tilt angle") to perform the tilt correction exhibits in general a symmetric characteristic i.e., it is appropriate to give the corrections to the $1^{st}$ area 25A and the $3^{rd}$ area 25C respectively in the reverse characteristics to each other with respect to the radial tilt angle. Further, in case of perform the tilt correction at the higher accuracy, it is appropriate to increase the number of the division areas of each of the transparent electrodes 22A and 22B with respect to the radial direction.

Figure 2E:
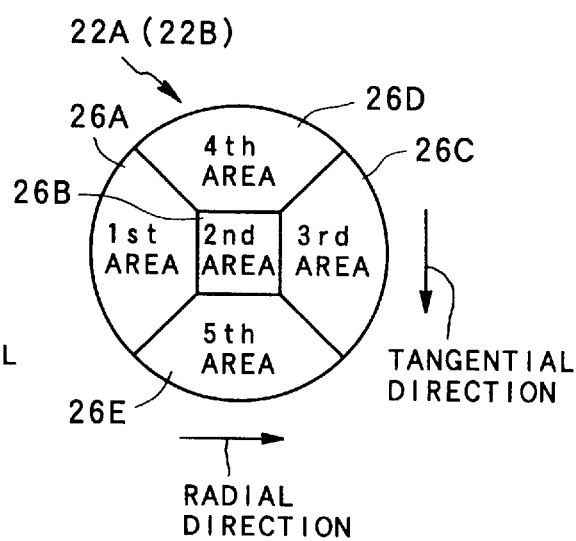
FIG. 2E is a schematic plan view showing a structure of a modified liquid crystal panel usable in the first embodiment.

Further, in case of correcting the tilt error generated in not only the radial direction but also the tangential direction (i.e., the tangential direction of the track), as shown in FIG. 2E, it is possible to divide each of the transparent electrodes 22A and 22B into 5 division areas. Namely, in case of FIG. 2E, in addition to a $1^{st}$ area 26A, a $2^{nd}$ area 26B and a $3^{rd}$ area 26C as division areas in the radial direction, there are a $4^{th}$ area 26D and a $5^{th}$ area 26E as division areas in the tangential direction, so that the tilt correction can be performed with respect to the tangential direction. It is appropriate to give the tilt correction characteristics, which are in symmetry with respect to the tilt angle in the tangential direction to each other, to the $4^{th}$ area 26D and the $5^{th}$ area 26E. In this case, it is also possible to further increase the number of division areas.

Next, the principle of the tilt error correction in the present embodiment is explained.

Figure 3:
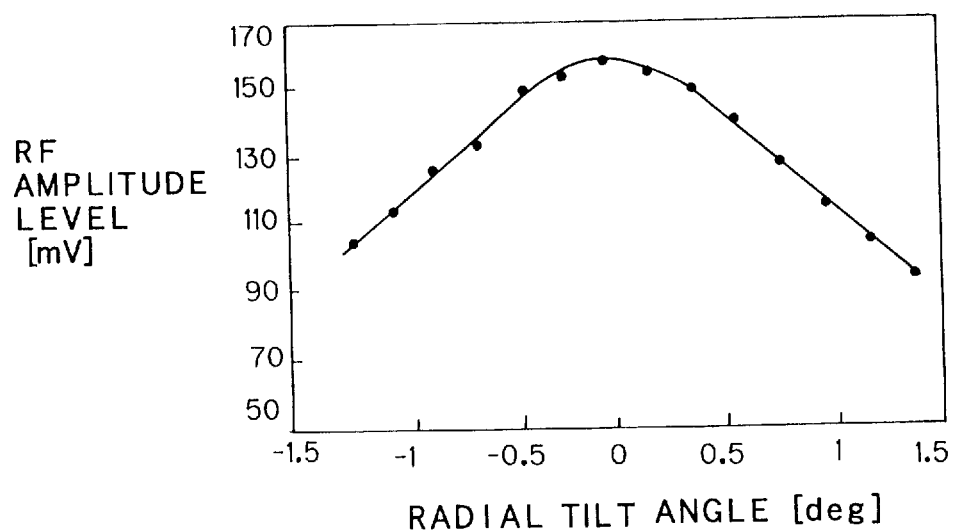
FIG. 3 is a graph showing a relationship between a radial tilt angle (degrees) and an RF amplitude level (mV) in the first embodiment of the present invention.

FIG. 3 shows one example of a relationship between a radial tilt angle (degrees) and an amplitude level of the RF signal Srf (mV) in the first embodiment of the present invention. In FIG. 3, the horizontal axis is graduated such that the radial tilt angle is "0" when the angle between the optical axis of the light beam and the surface of the optical disc at the irradiation position is perpendicular, the polarity is + (plus) when the tilt angle is generated in one radial direction from this perpendicular condition, and the polarity is − (minus) when the tilt angle is generated in another radial direction from this perpendicular condition.

As shown in FIG. 3, when the radial tilt angle is zero, the RF amplitude level takes a maximum value thereof, and that the RF amplitude level monotony decreases as the radial tilt angle becomes larger in the + or − direction. On the other hand, since the radial tilt angle and the RF amplitude level have the relationship shaped in a secondary curve on the graph, it is appropriate to correct the tilt error so that the RF amplitude level may take the maximum value (i.e., the peak value) thereof.

In the present embodiment, the tilt error correction is performed by adjusting the driving voltage for the liquid crystal panel 2A so as to give the phase difference to the light beam. Further, in order to perform the tilt error correction without the tilt sensor as in the aforementioned conventional case, the external disturbance is given to the driving voltage for the liquid crystal panel 2A, so that the tilt error correction is performed by adjusting the driving voltage in such a direction that the RF amplitude level becomes larger, in correspondence with the external disturbance. The concrete method of this tilt servo control will described later in detail.

Figure 4:
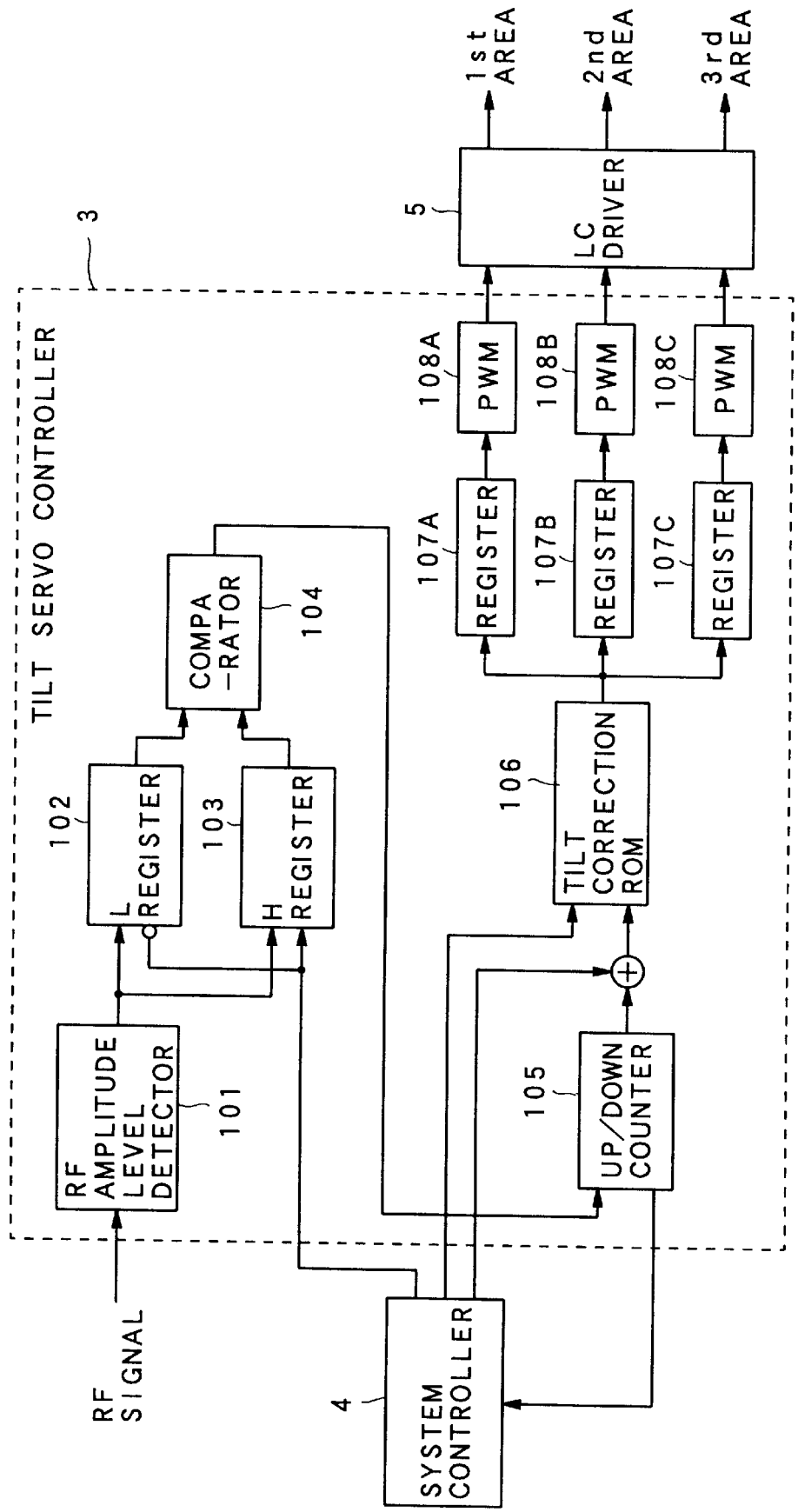
FIG. 4 is a block diagram of a tilt servo controller in the first embodiment.

In FIG. 4, the tilt servo controller 3, as one example of the tilt error correcting device, is provided with: an RF amplitude level detector 101; an L (Low) register 102; an H (High) register 103; a comparator 104; an up/down counter 105; a tilt correction ROM 106; registers 107A, 107B and 107C; and PWM units 109A, 108B and 108C.

When the RF signal Srf outputted from the optical pickup 2 is inputted to the RF amplitude level detector 101, the amplitude level of the RF signal Srf is detected, and the detection value is stored in the L register and the H register respectively under the control described later in detail. The system controller 4 and the tilt servo controller 3 perform a so-called "mountain climbing control" on the basis of the detection value of the RF amplitude level detector 101. More concretely, at first, by the comparator 104, the stored value in the L register 102 and the stored value in the H register 103 are compared with each other. Then, the address in the tilt correction ROM 106 is determined through the up/down counter 105 under the control described later in detail. Then, the data corresponding to the phase difference, which is to be given to each of the division areas of the liquid crystal panel 2A, is read out from the tilt correction ROM 106 at each determined address respectively. The data, which has been experimentally obtained to optimize the phase difference to be given to each of the division areas of the liquid crystal panel 2A in correspondence with the radial tilt angle, is stored in the tilt correction ROM 106. The data read out from the tilt correction ROM 106 is inputted to the liquid crystal driver 5 for driving each of the division areas, through the register 107A and the PWM unit 108A for the $1^{st}$ area 25A, the register 107B and the PWM unit 108B for the $2^{nd}$ area 25B, and the register 107C and the PWM unit 108C for the $3^{rd}$ area 25C, to thereby drive each of the division areas and control the phase correction amount for each of the division areas of the liquid crystal panel 2A.

In the data table stored in the tilt correction ROM 106, the value of the radial tilt angle is corresponding to each address. The tilt error generated for the radial tilt angle has a symmetry characteristic with respect to each of the division areas of the liquid crystal panel 2A. Thus, the correction amount for the $1^{st}$ area 25A is set so as to increase in one direction along with the increase of the address, while the correction amount for the $3^{rd}$ area 25C is set so as to increase in another direction along with the increase of the address. The correction amount for the $2^{nd}$ area 25B is set so as to keep the value of zero.

Here, the data stored in the tilt correction ROM 106 has been experimentally obtained in advance, such that the data gives the phase difference to each of the division areas of the liquid crystal panel 2A so as to optimize the jitter for each of the predetermined radial tilt angles. By fining the scale of this predetermined radial tilt angle more finely and increasing the data amount as a whole, it is possible to perform the tile error correction at the higher resolution.

On the other hand, since the characteristic of the liquid crystal changes by the temperature, the phase correction amount corresponding to the radial tilt angle also changes by the temperature. Therefore, it is effective to set a plurality of data tables in the tilt correction ROM 106 for the respective temperature ranges. In this case, by installing a temperature sensor and determining the appropriate data in the tilt correction ROM 106 on the basis of the detected temperature, it is possible to restrain the harmful influence due to the temperature variation.

Next, the concrete operation as for the tilt error correction by use of the mountain climbing control in the first embodiment is explained with reference to FIG. 5.

Figure 5:
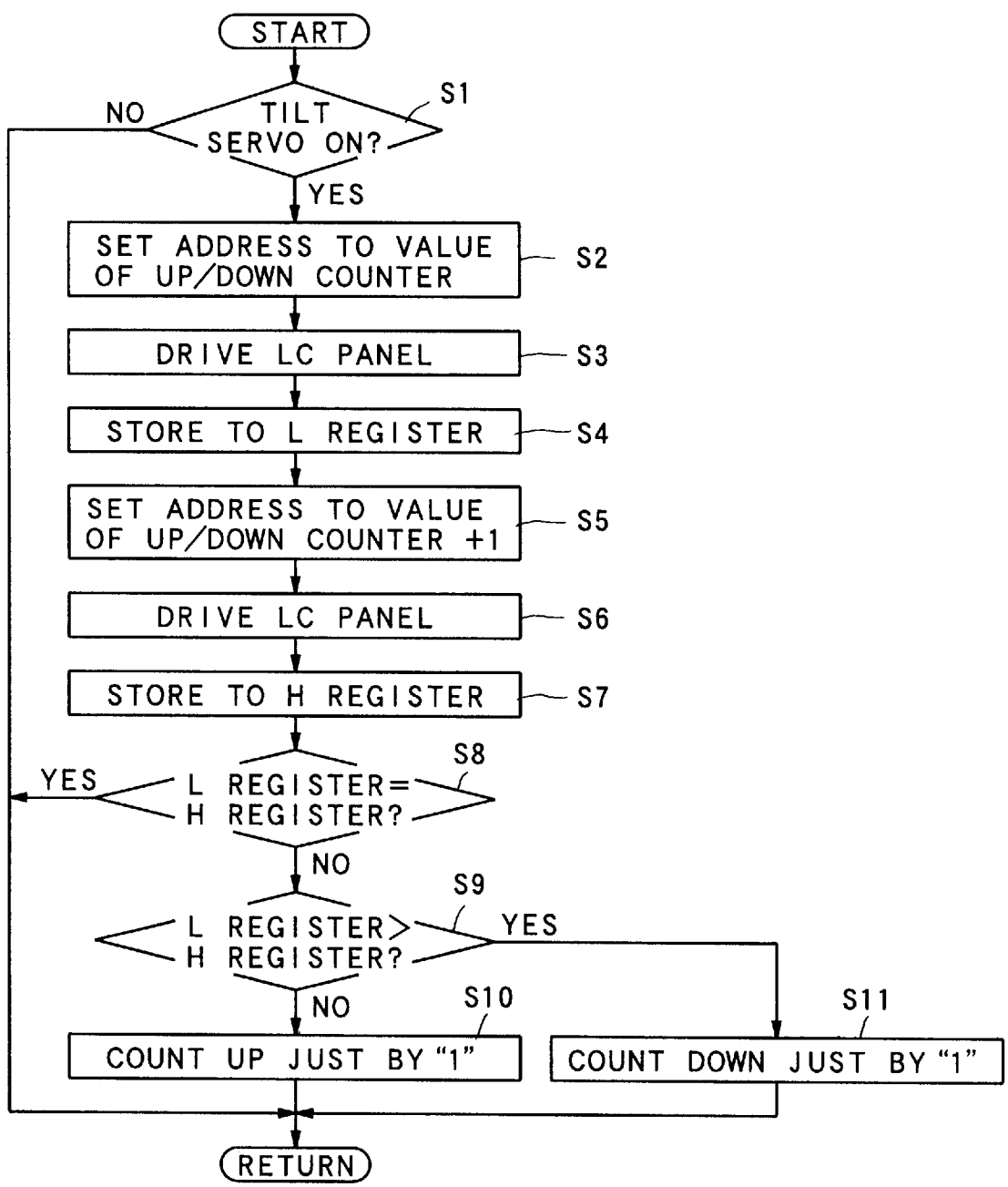
FIG. 5 is a flow chart showing a tilt error correcting operation of the tilt servo controller in the first embodiment.

The operation shown in FIG. 5 is performed by the interrupting process of the system controller 4 at a predetermined cycle during the recording or reproducing operation for the optical disc for example. At first, it is judged whether or not the tilt servo control is ON (step S1). If it is ON (step S1: YES), the processes explained below are performed. If it is OFF (step S1: NO), these processes are not performed. Namely, in case of performing these processes (step S1: YES), the value of the up/down counter 105 is read out, and the address of the tilt correction ROM 106 to be read out is set to this value of the up/down counter 105 (step S2). The data stored in the tilt correction ROM 106 at the set address is read out and is PWM-modulated, to thereby drive each of the division areas of the liquid crystal panel 2A (step S3). The detection value of the RF amplitude level detector 101 at this time is stored into the L register 102 (step S4).

Next, "1" is added to the value of the up/down counter 105, and the address of the tilt correction ROM 106 to be read out is set to this added value (step S5). The data stored in the tilt correction ROM 106 at the set address is read out and is PWM-modulated, to thereby drive each of the division areas of the liquid crystal panel 2A (step S6). The detection value of the RF amplitude level detector 101 at this time is stored into the H register 103 (Step S7). In this manner, two kinds of data at the addresses adjacent to each other in the tilt correction ROM 106 are applied onto the driving voltage for the liquid crystal panel 2A as the external disturbance.

Further, in order to perform the mountain climbing control by use of the detection values of the obtained two of RF amplitude levels, the stored value in the L register 102 and the stored value in the H register 103 are compared with each other by the comparator 104 (step S8 and step S9). If the compared values are equal to each other (step S8: YES), the processes afterward are not performed. If the compared values are not equal to each other (step S8: NO), the mountain climbing control is performed. Namely, if the stored value of the L register 102 is greater than the stored value of the H register 103 (step S9: YES), the up/down counter 105 is counted-down just by "1" (step S11). Alternatively, if the stored value of the L register 102 is not greater than the stored value of the H register 103 (step S9: NO), the up/down counter 105 is counted-up just by "1" (step S10). This updated value of the up/down counter 105 is used to determine the address of the tilt correction ROM 106 in the next interrupting process.

Incidentally, the initial value of the up/down counter 105 at the time of starting the first operation is set to a value in the tilt correction ROM 106 corresponding to such a condition that there is no difference in the phase correction amounts between the division areas of the liquid crystal panel 2A.

Here, the aspect of performing the mountain climbing control by the tilt error correction according to the present embodiment is explained with reference to FIGS. 6A and 6B.

Figure 6A:
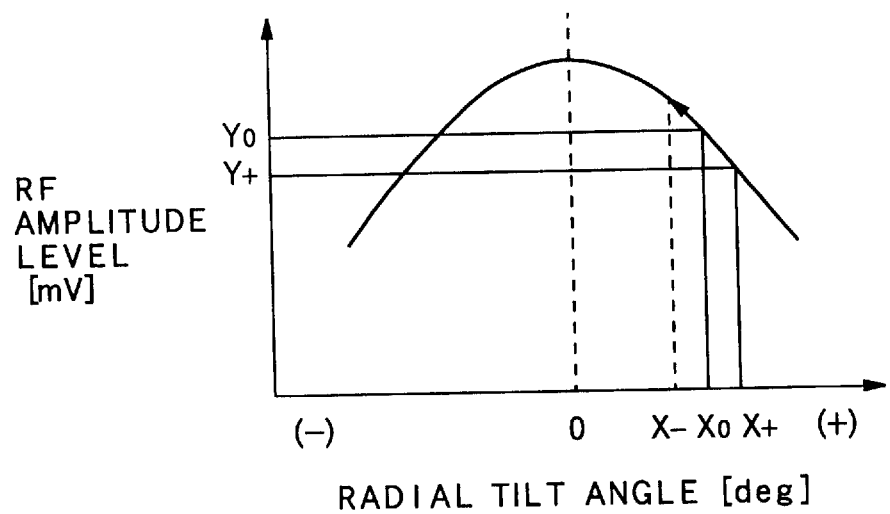
FIG. 6A is a graph showing the relationship between the radial tilt angle and the RF amplitude level when the radial tilt is generated in a positive direction in the first embodiment.
Figure 6B:
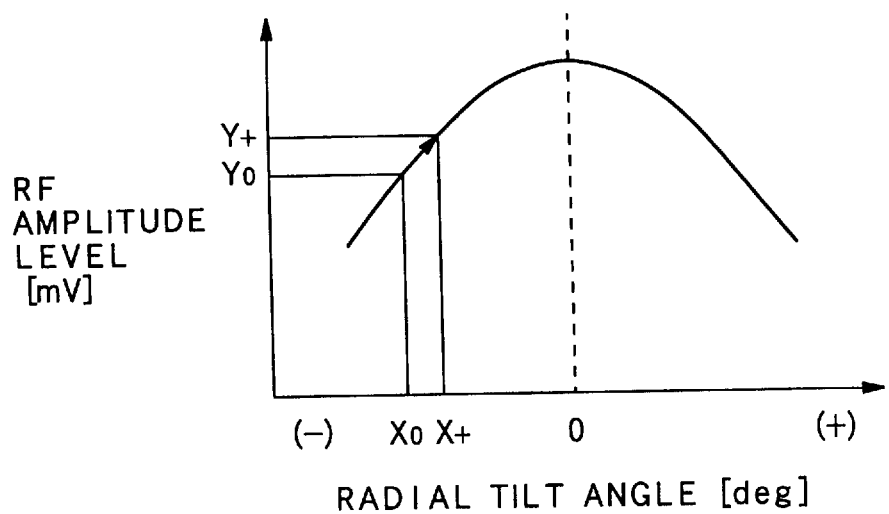
FIG. 6B is a graph showing the relationship between the radial tilt angle and the RF amplitude level when the radial tilt is generated in a negative direction in the first embodiment.

In each of FIGS. 6A and 6B, the horizontal axis is graduated such that the radial tilt angle is "0" when the angle between the optical axis of the light beam and the surface of the optical disc at the irradiation position is perpendicular, the polarity is + (plus) when the tilt angle is generated in one radial direction from this perpendicular condition, and the polarity is − (minus) when the tilt angle is generated in another radial direction from this perpendicular condition.

FIG. 6A shows such a condition that a radial tilt angle X0 is generated only in the positive (+) direction. At this time, by giving the tilt correction data corresponding to the radial tilt angle X0, the RF amplitude level Y0 corresponding to this time is stored. Next, by giving the tilt correction data corresponding to the radial tilt angle X+ equal to "the radial tilt angle X0 + an offset", the RF amplitude level Y+ corresponding to this time is stored. Then, these RF amplitude levels Y0 and Y+ for these two kinds of tilt correction data are compared with each other. Since "Y0>Y+" as shown in FIG. 6A, for updating the tilt correction data, the tilt correction data is used which corresponds to the radial tilt angle X− equal to "the radial tilt angle X0− the offset".

FIG. 6B shows such a condition that a radial tilt angle X0 is generated only in the negative (−) direction. In the same manner as the case of FIG. 6A, by giving the tilt correction data corresponding to each of the radial tilt angles X0 and X+ (equal to the radial tilt angle X0 + the offset), the RF amplitude levels Y0 and Y+ corresponding to these radial tilt angles X0 and X+ respectively are stored. Then, the RF amplitude levels Y0 and Y+ are compared with each other. Since "Y+>Y0" as shown in FIG. 6B, for updating the tilt correction data, the tilt correction data is used which corresponds to the radial tilt angle X+ (equal to the radial tilt angle X0 + the offset).

Therefore, in the secondary curve of the radial tilt angle and the RF amplitude level on the graph, even if the tilt error is generated in either of the plus and minus directions, the tilt servo control is performed so as to always move the radial tilt angle toward the peak of the RF amplitude level.

Incidentally, in the present embodiment, the controlling method of giving the two kinds of correction amounts as the external disturbances is explained. However, it is possible to give three or more than three kinds of external disturbances having the values within a predetermined range, and select one of the correction amounts which corresponds to the maximum value of the RF amplitude level.

Figure 7:
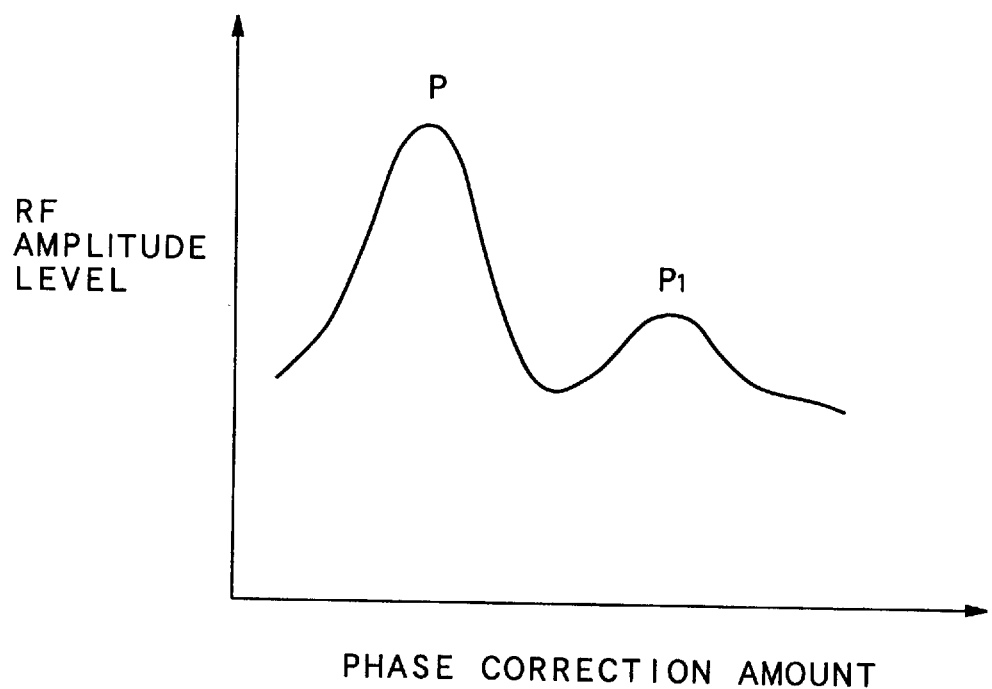
FIG. 7 is a graph showing the relationship between a phase correction amount and the RF amplitude level in the first embodiment.

On the other hand, the relationship between the radial tilt angle and the RF amplitude level is like a relationship expressed by a secondary curve or the like, there is only one peak as mentioned above. However, the characteristic of the RF amplitude levels with respect to the phase correction amount of the liquid crystal panel 2A has two peaks. Namely, in addition to the genuine peak, a pseudo peak is generated at the position where the phase correction amount is larger than the genuine peak. FIG. 7 shows an aspect of such a condition of two peaks.

In FIG. 7, a peak P on the characteristic curve is the genuine peak, while a peak P1 is a pseudo peak. This phenomena is caused because the phase is inverted as the liquid crystal driving amount is made large to exceed a certain value. If the tilt servo control is performed by the mountain climbing control or the like for this kind of situation that there are two peaks, it is difficult to judge toward which peak the servo control is to be applied. Further, if the tilt servo control is applied with respect to the pseudo peak P1, the reproduction of the data is difficult because of the influence of the jitter.

The present embodiment deals with this problem by a unique manner of giving the data of the tilt correction ROM 106. Namely, with respect to the data stored in the tilt correction ROM 106, a predetermined upper limit value is prescribed, so that the phase correction amount does not exceed a predetermined value. This upper limit value is a value corresponding to the phase correction amount which is much smaller than the phase correction amount causing the pseudo peak P1. By this, even if the tilt servo control is actuated, the tilt servo control is not directed toward the pseudo peak P1, but the tilt servo control can be applied in a stable manner with respect to the genuine peak P.

In addition, since the upper limit value, which is prescribed for the phase correction amount, also changes by the temperature, it is effective to prepare a plurality of data tables for various predetermined temperature ranges.

Figure 8:
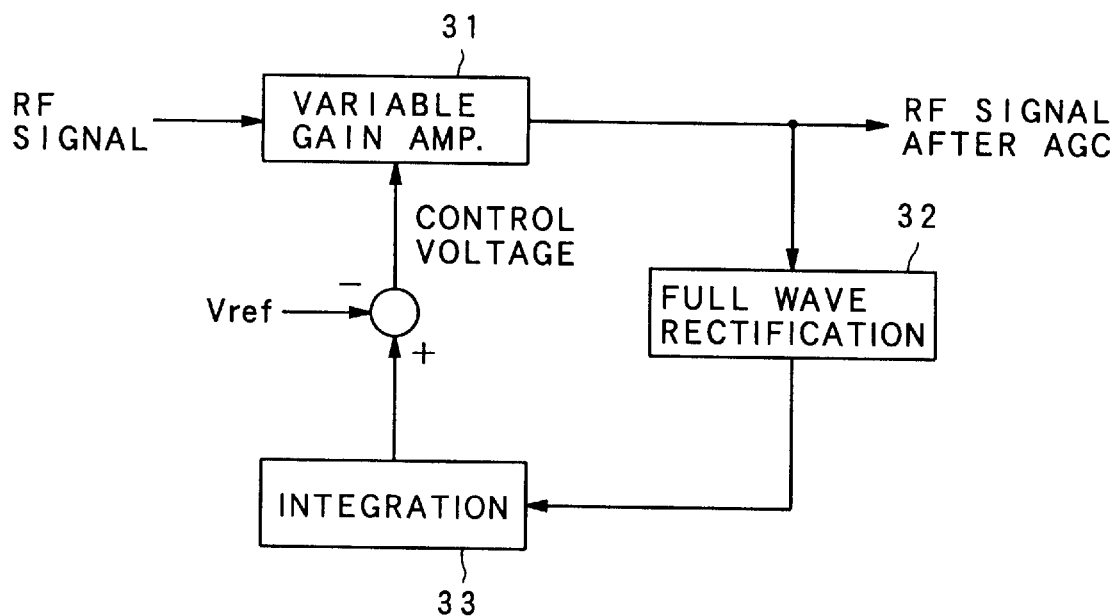
FIG. 8 is a block diagram showing a concrete structure of an RF amplitude level detector by means of a control voltage of an AGC amplifier in the first embodiment.

FIG. 8 shows one example of a concrete structure of the RF amplitude level detector 101. In the present embodiment, as a detection signal of the amplitude level of the RF signal Srf, a control voltage which is applied as a gain control signal of an AGC (Automatic Gain Control) amplifier is utilized. Since, even in case that the amplitude level of the RF signal Srf tends to be changed by various factors, the AGC amplifier tries to keep the amplitude level of the RF signal Srf constant so as to keep the reproduction quality stable. Since the control voltage (i.e. the voltage value of the gain control signal) is determined by the RF amplitude level, the AGC amplifier can be utilized as one example of a level detecting device for detecting the RF amplitude level.

More concretely, as shown in FIG. 8, the AGC amplifier is provided with a variable gain amplifier 31, a full wave rectification circuit 32 and an integration circuit 33.

The RF signal Srf is inputted to the variable gain amplifier 31, and is amplified by the gain determined by the control voltage. The output signal of the variable gain amplifier 31 is rectified by the full wave rectification circuit 32, and the high frequency component thereof is removed by the integration circuit 33. Then, a difference between the output signal of the integration circuit 33 and the reference voltage Vref is obtained to be the control voltage for the variable gain amplifier 31. The output level of the variable gain amplifier 31 is controlled to stay at a constant level in correspondence with the value of the standard voltage Vref, so as to increase the gain in case that the input level of the variable gain amplifier 31 is small and decrease the gain in case that the input level of the variable gain amplifier is large. On the other hand, since the gain of the variable gain amplifier 31 depends on the control voltage, the amplitude level of the RF signal Srf can be obtained from the control voltage (the voltage value of the gain control signal).

Figure 9:
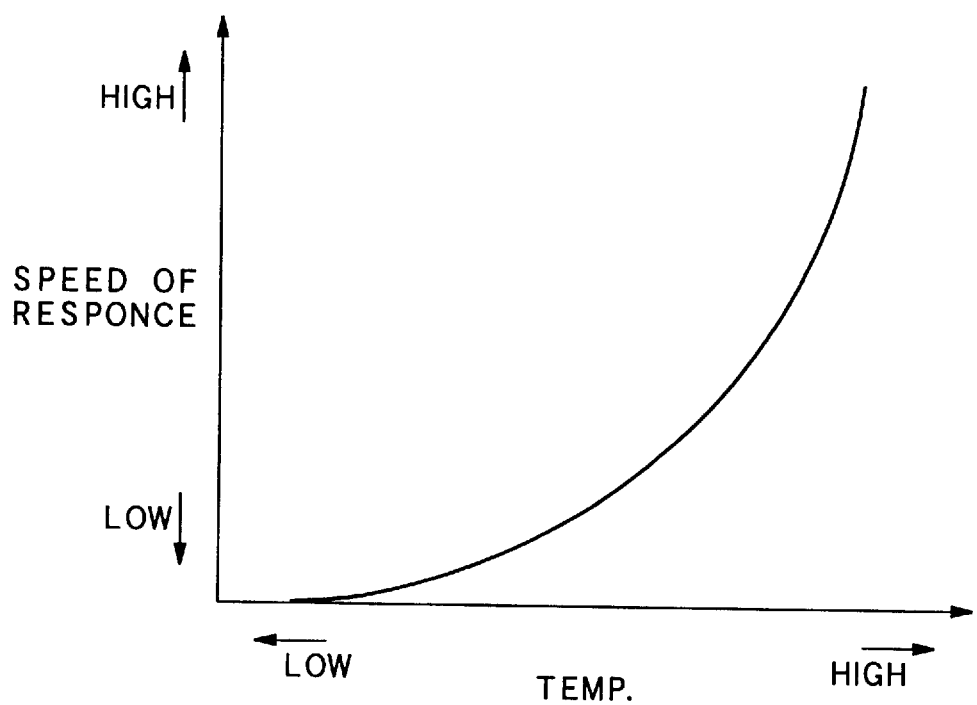
FIG. 9 is a graph showing a temperature characteristic of the liquid crystal in the first embodiment.

By the way, the viscosity coefficient of the liquid crystal increases as the ambient temperature decreases. As a result, as shown in FIG. 9, the liquid crystal has such a characteristic that the response speed at the time of applying the driving voltage decreases as the temperature decreases because the viscosity coefficient of the liquid crystal increases at that time.

Because of this characteristic, in case that the tilt servo controlling apparatus of the present embodiment is operated, a difference is generated in the operation between a low temperature condition and a high temperature condition. This difference is explained with reference to FIGS. 10A and 10B.

Figure 10A:
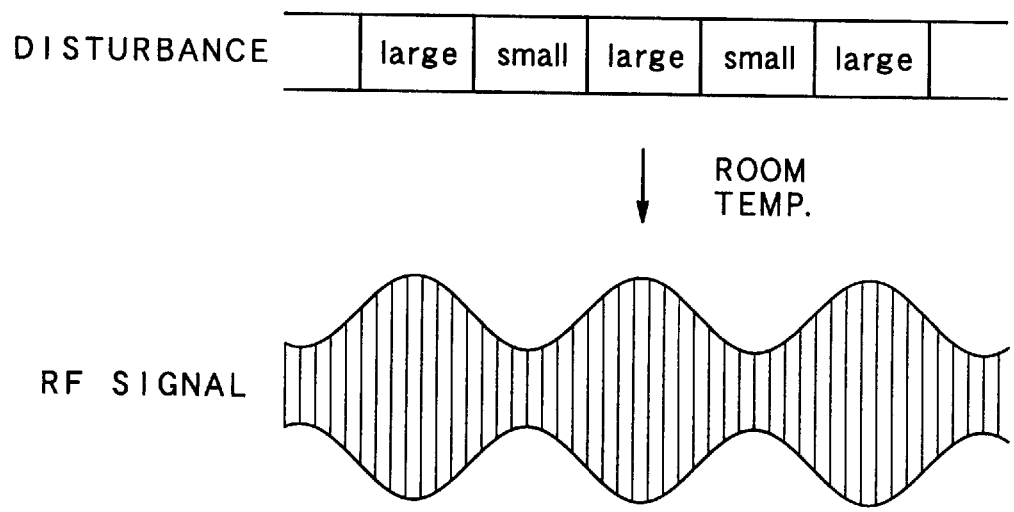
FIG. 10A is a diagram showing a relationship between an external disturbance applied to the driving voltage for the liquid crystal panel and the RF signal at a room temperature.
Figure 10B:
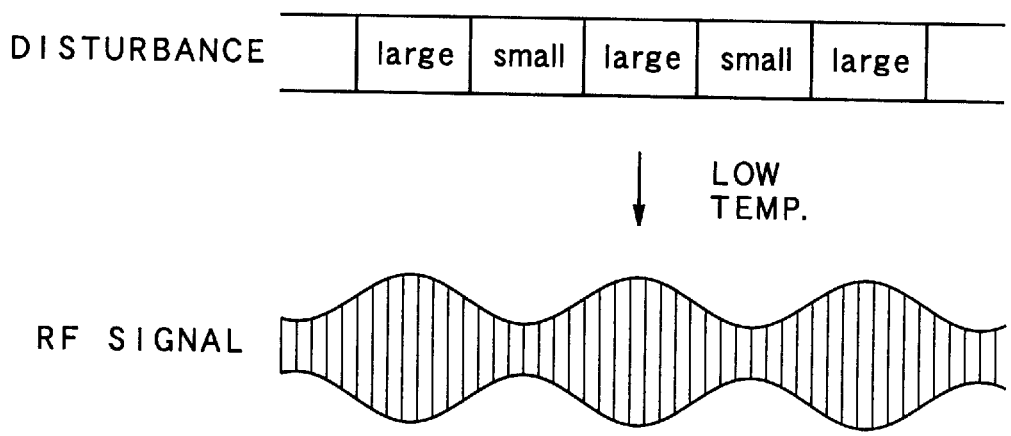
FIG. 10B is a diagram showing a relationship between an external disturbance applied to the driving voltage for the liquid crystal panel and the RF signal at a low temperature.

FIGS. 10A and 10B show the relationships between the external disturbance applied to the driving voltage for the liquid crystal panel and the RF signal at a room temperature and a low temperature respectively.

In FIGS. 10A and 10B, the external disturbance, which is to increase the amplitude of the RF signal when it is added to the driving voltage of the liquid crystal panel, is indicated by a "large". The external disturbance, which is to decrease the amplitude of the RF signal when it is added to the driving voltage of the liquid crystal panel, is indicated by a "small".

As shown in FIG. 10A, at the room temperature, the liquid crystal keeps up with the applied external disturbance, so that the phase difference between the external disturbance and the RF signal is within 180 degrees. As a result, the direction of the applied external disturbance and the direction of the change in the amplitude of the RF signal corresponding to the applied external disturbance are coincident to each other. Thereby, it is possible to perform the tilt correction in the direction corresponding to the direction of the change in the amplitude of the RF signal.

Contrary to this, as shown in FIG. 10B, at the low temperature, the response speed of the liquid crystal with respect to the applied external disturbance is lowered, so that the phase difference between the external disturbance and the RF signal reaches 180 degrees. As a result, the direction of the applied external disturbance and the direction of the change in the amplitude of the RF signal corresponding to the applied external disturbance are reverse to each other.

Further, as understood from FIG. 10B, at the low temperature, before the liquid crystal catches up with one of the applied two kinds of the external disturbances, the other of the applied two kinds of the external disturbances is applied, so that the RF amplitude level is small.

As a result, at the low temperature, even if two kinds of the external disturbances are applied to the driving voltage of the liquid crystal panel, it cannot be detected whether the RF amplitude level is increases or decreased when either one of the two kinds of the external disturbances is applied. Thereby, there may be raised a case where it is difficult to perform the aforementioned mountain climbing control precisely. A second embodiment of the present invention described below is constructed to solve this problem.

(2) Second Embodiment

Figure 11:
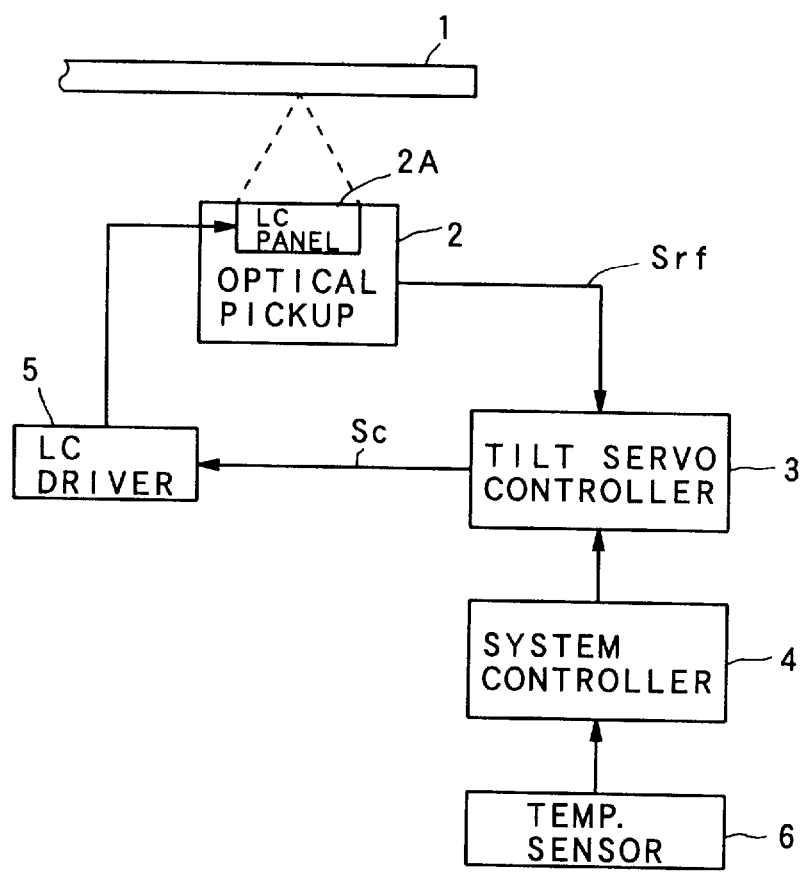
FIG. 11 is a block diagram of a tilt servo controlling apparatus as a second embodiment of the present invention.

Next, the second embodiment of the present invention is explained with reference to FIG. 11. In FIG. 11, the same constitutional elements as those in the first embodiment of FIG. 1 carry the same reference numerals, and the explanations thereof are omitted.

In FIG. 11, a temperature sensor 6 is added to the construction of the first embodiment of FIG. 1.

The temperature sensor 6 detects an ambient temperature i.e. an environmental temperature of the liquid crystal panel 2A, and outputs data Dt corresponding to the detected temperature to the system controller 4. The system controller 4 changes the frequency of the external disturbance on the basis of the data Dt.

Figure 12:
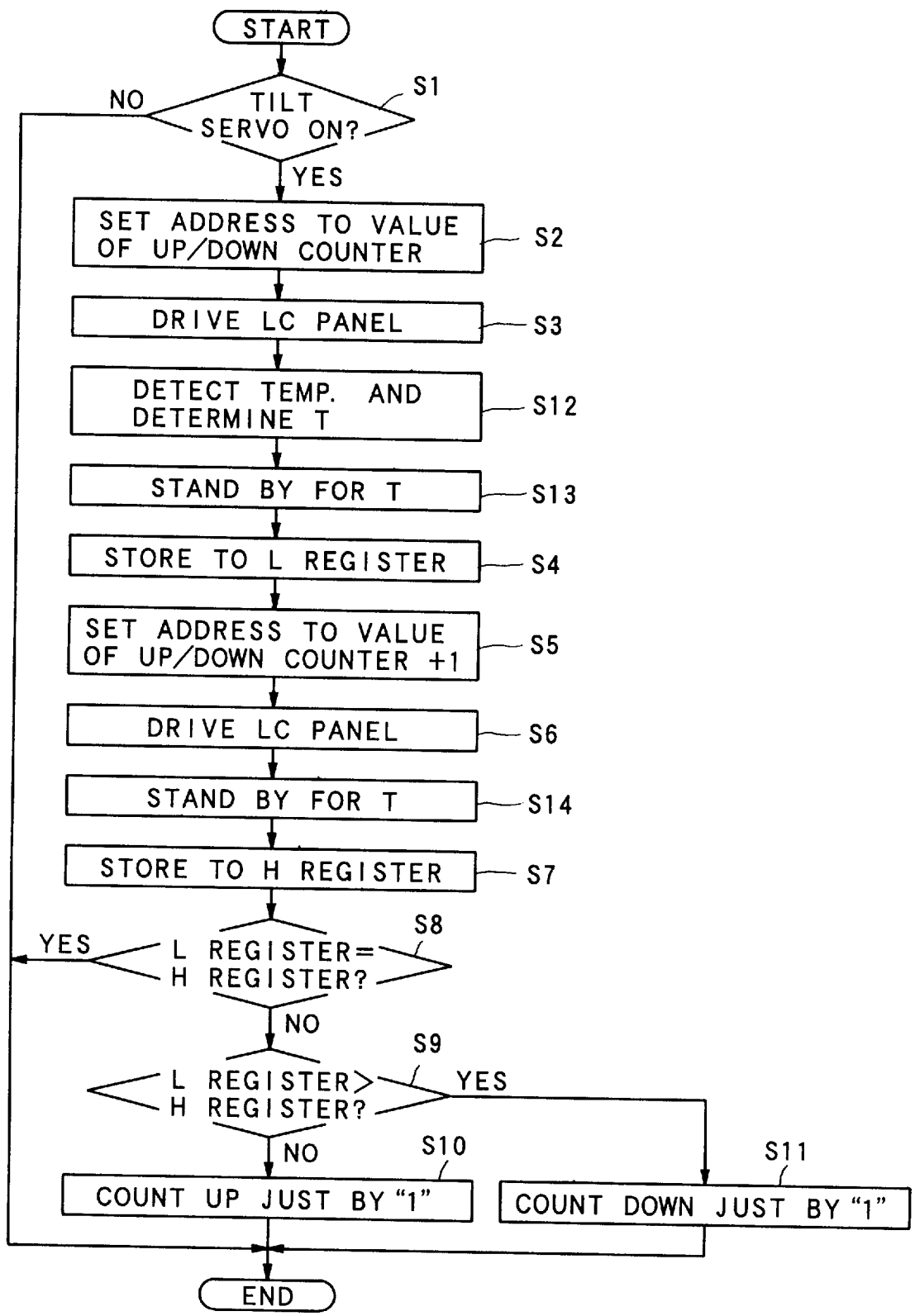
FIG. 12 is a flow chart showing a tilt error correcting operation of the tilt servo controller in the second embodiment.

Next, the concrete operation as for the tilt error correction by use of the mountain climbing control in the second embodiment is explained with reference to FIG. 12. In FIG. 12, the same steps as those in the first embodiment of FIG. 5 carry the same step numbers, and the explanations thereof are omitted.

The operation shown in FIG. 12 is performed by the interrupting process of the system controller 4 at a predetermined cycle during the recording or reproducing operation for the optical disc for example.

At first, in the same manner as the first embodiment of FIG. 5, if the tilt servo control is ON, the address of the tilt correction ROM is set to the value of the up/down counter, and the liquid crystal panel is driven by the data in the tilt correction ROM at that address (step S1 to S3).

Next, by the temperature sensor 6, the ambient temperature is detected, and a stand-by time T is determined on the basis of the value of the data Dt corresponding to the detected temperature (step S12). Then, the tilt servo controlling apparatus stands by for the stand-by time T (step S13). The manner to determine this stand-by time T is performed as following, for example. Namely, the value of the data Dt and a predetermined threshold value TH are compared with each other. Then, if the value of the data Dt is smaller than the threshold value TH, it is judged that the ambient temperature is low, so that the stand-by time T is set to a relatively large value. If the value of the data Dt is equal to or larger than the threshold value TH, it is judged that the ambient temperature is a room temperature, so that the stand-by time T is set to a relatively small value e.g. "0".

Next, in the same manner as the first embodiment of FIG. 5, the detection value of the RF amplitude level is stored in the L register, the address of the tilt correction ROM is set to a value obtained by adding "1" to the value of the up/down counter, and the liquid crystal panel is driven by the data in the tilt correction ROM at the address (step S4 to S6).

Then, the tilt servo controlling apparatus stands by again for the stand-by time T, which has been determined at the step S12 (step S14).

Next, in the same manner as the first embodiment of FIG. 5, after storing the detection value of the RF amplitude level into the H register, the mountain climbing control is performed. Namely, the values of the L register and the H register are compared with each other. Then, if the compared values are coincident with each other, the processes afterward are not performed. If the value of the L register is greater than the value of the H register, the up/down counter is counted-down just by "1". Alternatively, if the value of the L register is not greater than the value of the H register, the up/down counter is counted-up just by "1" (step S7 to S11). This updated value of the up/down counter is used to determine the address for the tilt correction ROM in the next interrupting process.

By performing the consecutive processes shown in FIG. 12, at the time of the low temperature, the cycle of the correction amount to be given as the external disturbance is made longer than that at the time of the room temperature. Namely, in FIG. 12, at the time of the low temperature, the time duration T during which the driving voltage based on the two kinds of data is applied for one loop is set longer than that at the time of the room temperature, so that it is possible to set the cycle of one loop of the external disturbance at the time of the low temperature longer than that at the time of the room temperature. In other words, the frequency of the external disturbance at the time of the low temperature can be set lower than that at the time of the room temperature.

As a result, since the frequency of the external disturbance applied to the liquid crystal panel at the time of the low temperature is lowered, the liquid crystal can keep up with the change of the external disturbance at the time of the low temperature (when the viscosity coefficient of the liquid crystal is high). Thus, such a case hardly occurs that the direction of the applied external disturbance and the direction of the change in the RF amplitude level corresponding to it are reverse to each other (refer to FIGS. 10A and 10B). Accordingly, it becomes possible to appropriately search the liquid crystal driving signal in the direction to increase the RF amplitude level at the time of the low temperature. Further, since, after the liquid crystal catches up with one of the applied two kinds of the external disturbances, the other of the applied two kinds of the external disturbances is applied, it is possible to obtain the enough large RF amplitude level (refer to FIGS. 10A and 10B).

In the second embodiment, the tilt servo controlling apparatus is constructed such that it is judged whether or not the temperature is low on the basis of the predetermined threshold value VH at the time of determining the stand-by time T, so as to lower the frequency of the external disturbance in case of the low temperature. However, the tilt servo controlling apparatus may be constructed such that the temperature condition is judged on the basis of two or more than two of threshold values, and the frequency of the external disturbance is set on the basis of the judgment result. In this case, at the step S12 of FIG. 12, a plurality of threshold values may be used to judge the temperature condition, and the time based on the temperature condition respectively may be set as the stand-by time T. If the stand-by time T is set to be longer as the temperature is the lower, it is possible to set the frequency of the external disturbance lower as the temperature is the lower. By constructing the tilt servo controlling apparatus in this manner, it is possible to compensate the response delay due to the temperature characteristic of the liquid crystal at a high resolution.

By the way, in case of performing the mountain climbing control for driving the liquid crystal in such a direction that the RF amplitude level becomes larger according to the present invention, there may be a case that the RF amplitude level drastically changes although the external disturbance is not applied to the liquid crystal if the surface deflection etc. due to the distortion of the optical disc is large. In this condition, there may be a case that it is not possible to detect which one of the external disturbances is applied to the driving voltage for the liquid crystal panel when the RF amplitude level is made larger.

This case is explained with reference to FIG. 13.

Figure 13:
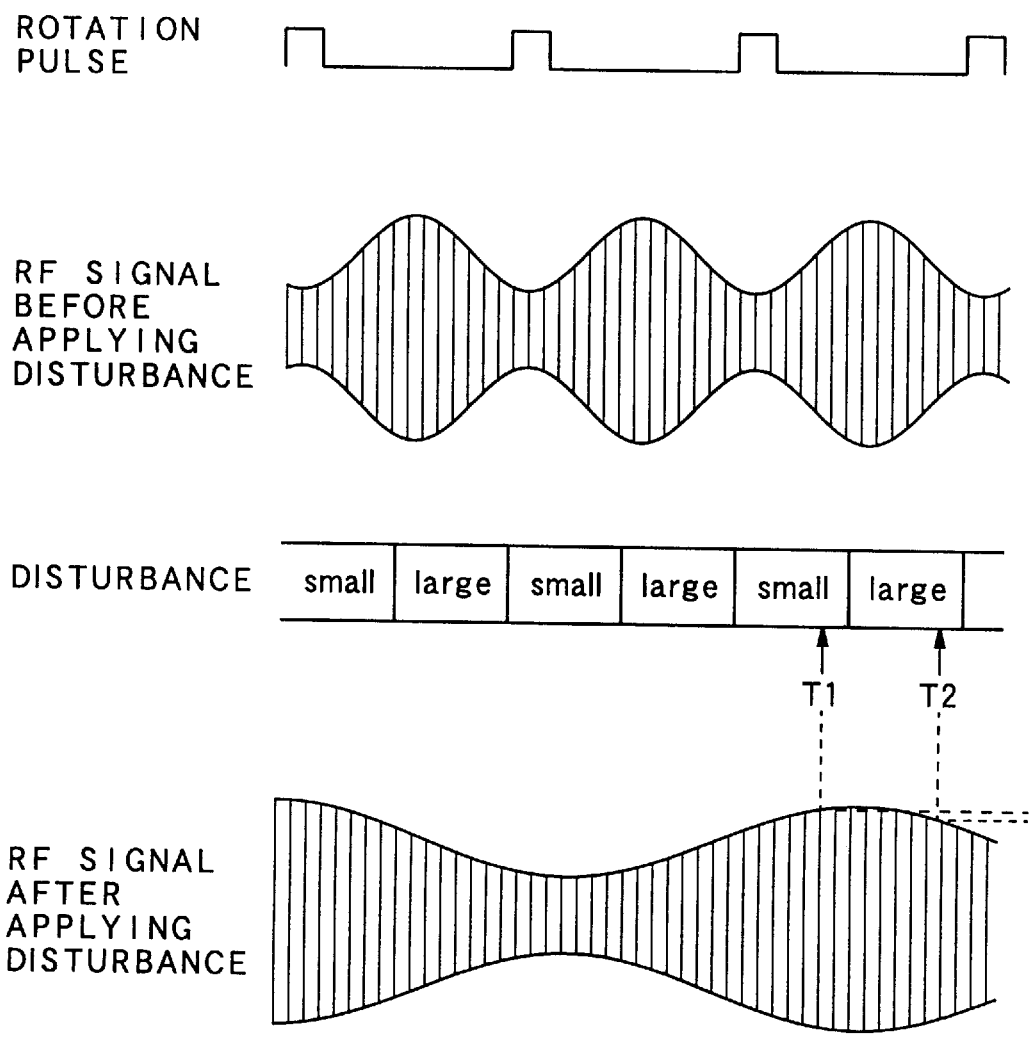
FIG. 13 is a chart showing a relationship on a time base between an external disturbance, which is applied onto a driving voltage of the liquid crystal panel and which does not have any relationship with a rotation cycle of the optical disc, the RF signal before applying the external disturbance and the RF signal after applying the external disturbance, in a third embodiment of the present invention.

A rotation pulse at the upper most stage of FIG. 13 is outputted one by one per one rotation of the optical disc.

The external disturbance at the third stage from the upper side is expressed such that, in a condition where there is no change in the RF amplitude level in synchronization with the rotation of the optical disc such as a surface deflection or the like, the external disturbance, which increases the amplitude of the RF signal when it is added to the driving voltage of the liquid crystal panel, is indicated by a "large" while the external disturbance, which decreases the amplitude of the RF signal when it is added to the driving voltage of the liquid crystal panel, is indicated by a "small".

As understood from FIG. 13, in case that the RF amplitude level is changed in synchronization with the rotation cycle of the optical disc already before applying the external disturbance (at the second stage from the upper side in FIG. 13), there may be a case that the mountain climbing control cannot be performed in the direction that the RF amplitude level is increased when the external disturbance is applied to the driving voltage for the liquid crystal panel by the cycle, which has no relationship with the disc rotation cycle. Namely, as shown at the lowest stage in FIG. 13, comparing the RF amplitude level at a time point T1 and the RF amplitude level at a time point T2 with each other, although the RF amplitude level while applying the external disturbance in the "small" direction (at the time point T1) is ought to be smaller than the RF amplitude level while applying the external disturbance in the "large" direction (at the time point T2), the relationship is in fact reverse of that. This is because the change in the RF amplitude level synchronized with the rotation of the optical disc such as the surface deflection etc., acts in the direction reverse to the change in the RF amplitude level due to the application of the external disturbance.

In such a condition, even if the external disturbance is applied to the driving voltage for the liquid crystal, it is not possible to precisely judge which external disturbance makes the RF amplitude level larger than the other, so that there is raised a problem that it is difficult to search the driving voltage in the direction to increase the RF amplitude level. A third embodiment of the present invention described below is constructed to solve this problem.

(3) Third Embodiment

Figure 15:
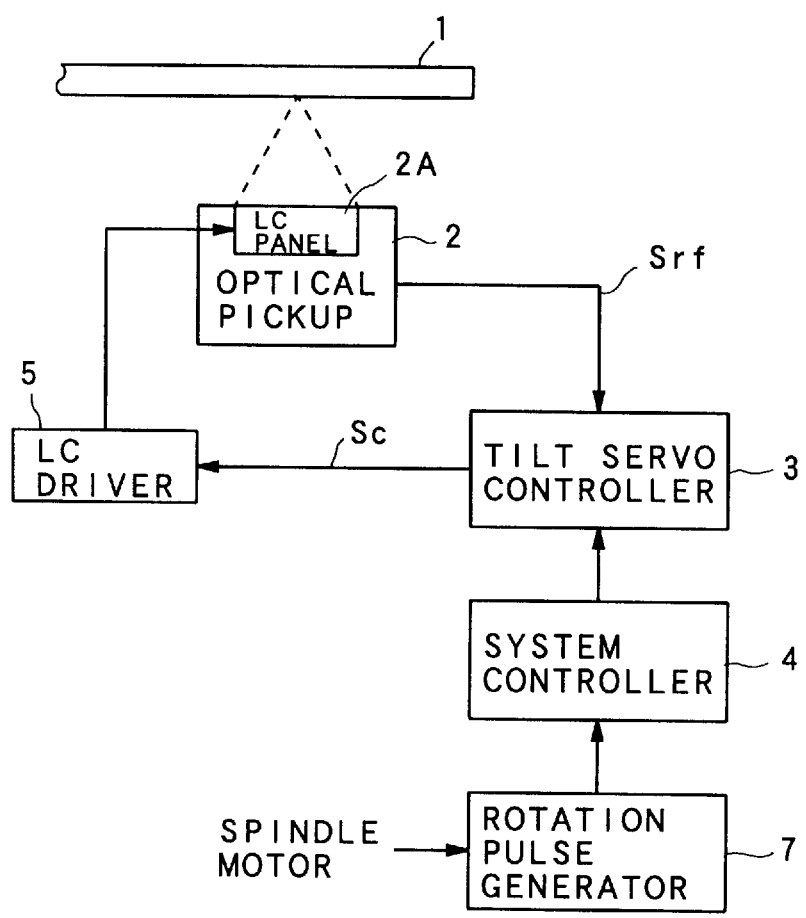
FIG. 15 is a block diagram of a tilt servo controlling apparatus as a third embodiment of the present invention.

In FIG. 15, which is a block diagram of a tilt servo controlling apparatus as the third embodiment, a rotation pulse generator 7 is added to the construction of the first embodiment of FIG. 1. In FIG. 15, the same constitutional elements as those in the first embodiment of FIG. 1 carry the same reference numerals, and the explanations thereof are omitted.

The rotation pulse generator 7 generates a frequency signal based on a pulse synchronized with the rotation, which is from the spindle motor (not shown) for rotating the optical disc, and is outputted to the system controller 4. In the example below, the rotation pulse generator 7 generates one pulse per one rotation of the spindle motor 1.

Figure 16:
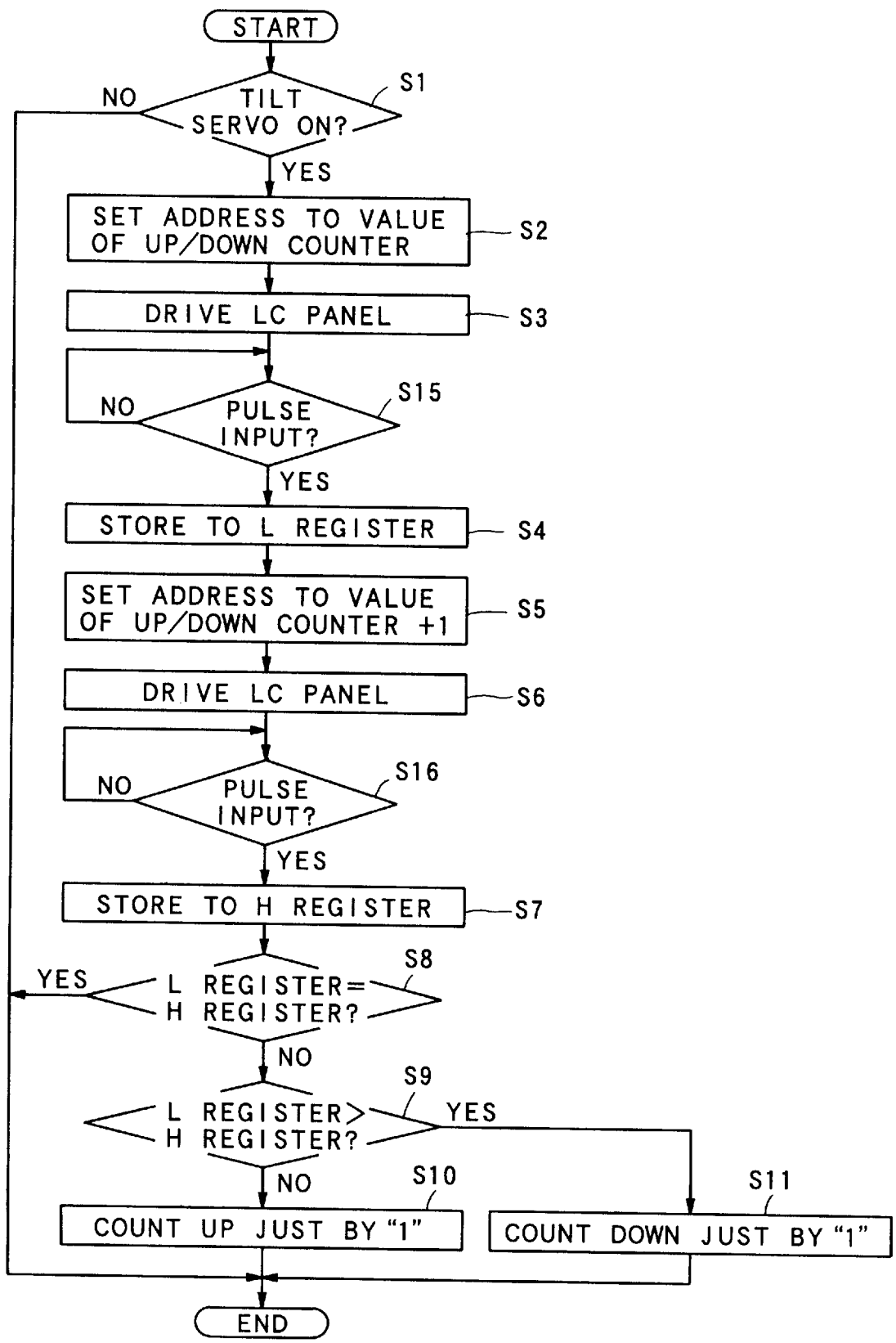
FIG. 16 is a flow chart showing a tilt error correcting operation of the tilt servo controller in the third embodiment.

Next, the concrete operation as for the tilt error correction by use of the mountain climbing control in the third embodiment is explained with reference to FIG. 16. In FIG. 16, the same steps as those in the first embodiment of FIG. 5 carry the same step numbers, and the explanations thereof are omitted.

The operation shown in FIG. 16 is performed by the interrupting process of the system controller 4 at a predetermined cycle during the recording or reproducing operation for the optical disc for example.

At first, in the same manner as the first embodiment of FIG. 5, if the tilt servo control is ON, the address of the tilt correction ROM is set to the value of the up/down counter, and the liquid crystal panel is driven by the data in the tilt correction ROM at that address (step S1 to S3).

Next, the tilt servo controlling apparatus stands by until the pulse is generated from the rotation pulse generator 7 (step S15).

When the pulse is generated and inputted (step S15: YES), in the same manner as the first embodiment of FIG. 5, the detection value of the RF amplitude level is stored in the L register, the address of the tilt correction ROM is set to a value obtained by adding "1" to the value of the up/down counter, and the liquid crystal panel is driven by the data in the tilt correction ROM at the address (step S4 to S6).

Then, the tilt servo controlling apparatus stands by until the pulse is generated from the rotation pulse generator 7 in the same manner as the step S15 (step S16).

Next, in the same manner as the first embodiment of FIG. 5, after storing the detection value of the RF amplitude level into the H register, the mountain climbing control is performed. Namely, the values of the L register and the H register are compared with each other. Then, if the compared values are coincident with each other, the processes afterward are not performed. If the value of the L register is greater than the value of the H register, the up/down counter is counted-down just by "1". Alternatively, if the value of the L register is not greater than the value of the H register, the up/down counter is counted-up just by "1" (step S7 to S11). This updated value of the up/down counter is used to determine the address for the tilt correction ROM in the next interrupting process.

By performing the consecutive processes shown in FIG. 16, it is possible to apply the external disturbance to the liquid crystal in synchronization with the change of the RF amplitude level synchronized with the rotation of the optical disc such as the surface deflection or the like. Namely, in FIG. 16, by matching the timing of applying the driving voltages based on the two kinds of data to the liquid crystal panel for one loop, with the pulse synchronized with the rotation of the spindle motor respectively, it is possible to match the timing of the change in the RF amplitude level synchronized with the rotation of the optical disc, with the timing of applying the external disturbance.

Figure 14:
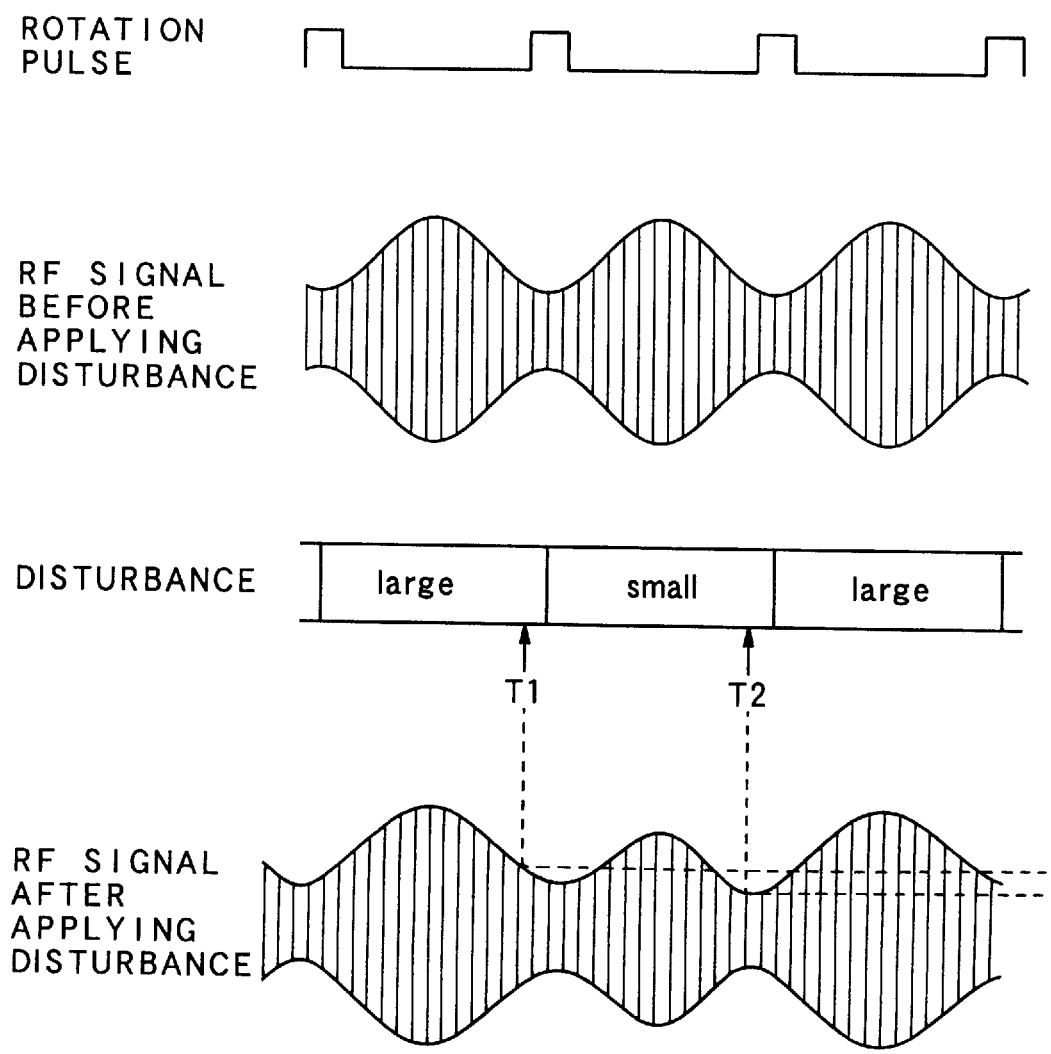
FIG. 14 is a chart showing a relationship on a time base between an external disturbance, which is applied onto the driving voltage of the liquid crystal panel and which is synchronized with the rotation cycle of the optical disc, the RF signal before applying the external disturbance and the RF signal after applying the external disturbance, in the third embodiment.

As a result, as shown in FIG. 14, the changes in the RF amplitude level synchronized with the rotation of the optical disc, while applying the two kinds of the external disturbances to the driving voltage for the liquid crystal panel, are coincident with each other, so that it is possible to compare the RF amplitude levels by use of the two kinds of the external disturbances under the same condition. Namely, if (i) the RF amplitude level while applying the external disturbance in the "small" direction (at the time point T1) and (ii) the RF amplitude level while applying the external disturbance in the "large" direction (at the time point T2) are compared with each other, the RF amplitude level at the time point T2 is smaller than that at the time point T1.

Therefore, it is possible to judge which one of the two kinds of the external disturbances increases the RF amplitude level when the two kinds of the external disturbances are applied to the driving voltage for the liquid crystal panel, so that it is possible to search the driving voltage in the direction to increase the RF amplitude level.

In each of the above described second and third embodiments, the detection of the RF amplitude level is performed in synchronization with the timing of applying the external disturbance. For example, in the flow chart of FIG. 12, after applying the external disturbance at the steps S3 and S6 respectively, the tilt servo controlling apparatus stands-by for the predetermined time T, and at the steps S4 and S7, the RF amplitude level is stored into the L register and the H register respectively. In the flow chart of FIG. 16, after applying the external disturbance at the steps S3 and S6 respectively, the tilt servo controlling apparatus stands-by until the rotation pulse is inputted, and at the steps S4 and S7, the RF amplitude level is stored into the L register and the H register respectively. By detecting the RF amplitude level at such timings, it is possible to detect the RF amplitude level in the phases same to each other when applying the two kinds of the external disturbances, and it is possible to precisely judge which one of the two kinds of the external disturbances increases the RF amplitude level.

In the above described third embodiment, the tilt servo controlling apparatus is constructed such that the optical disc is rotated by 2 rotations for one cycle of the external disturbance. However, as long as the rotation cycle of the optical disc is an even number times of the cycle of the external disturbance, the construction is optional.

This figure is explained in detail with reference to FIG. 17.

Figure 17:
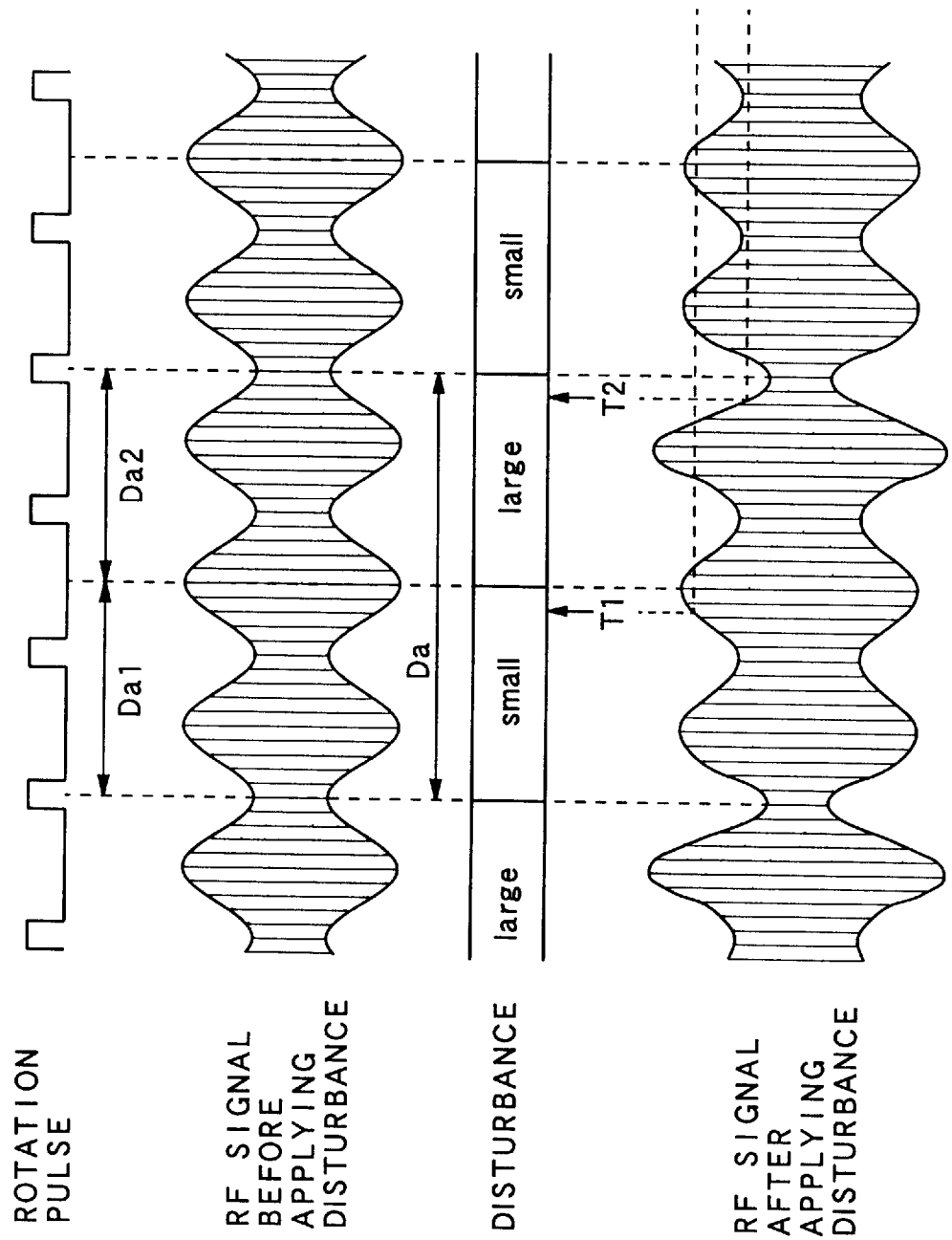
FIG. 17 is a chart showing a relationship on a time base between an external disturbance, which is applied onto a driving voltage of the liquid crystal panel and which is synchronized with a rotation cycle of the optical disc, the RF signal before applying the external disturbance and the RF signal after applying the external disturbance, in the third embodiment.

FIG. 17 shows a case where the optical disc rotates by 3 rotations during one cycle of the external disturbance i.e., a case where the rotation cycle of the optical disc is an odd number times of the cycle of the external disturbance.

As understood from FIG. 17, the RF amplitude level while applying the external disturbance in the "small" direction (at the time point T1) and the RF amplitude level while applying the external disturbance in the "large" direction (at the time point T2) are compared with each other, the RF amplitude level at the time point T2 is smaller than that at the time point T1, so that it is not possible to precisely judge which one of the two kinds of the external disturbances makes the RF amplitude level larger.

This is because the wave form of the RF signal synchronized with the rotation of the optical disc before applying the external disturbance while applying the external disturbance in the "small" direction (in a duration Da1) and that while applying the external disturbance in the "large" direction (in a duration Da2) are different from each other, so that the phases thereof are in reverse to each other.

Namely, the changes in the RF amplitude level while applying the two kinds of the external disturbances in the direction of "large" and in the direction of "small" respectively are different from each other. Thus, the comparison of the RF amplitude levels due to the two kinds of the external disturbances is performed under the different condition. Therefore, depending on the time point of measuring the RF amplitude level, as shown in the case of the time point T1 or T2 in FIG. 17, there may be raised a case where it is not possible to correctly judge which one of the two kinds of the external disturbances makes the RF amplitude level larger when the two kinds of the external disturbances are applied to the driving voltage for the liquid crystal panel.

Figure 18:
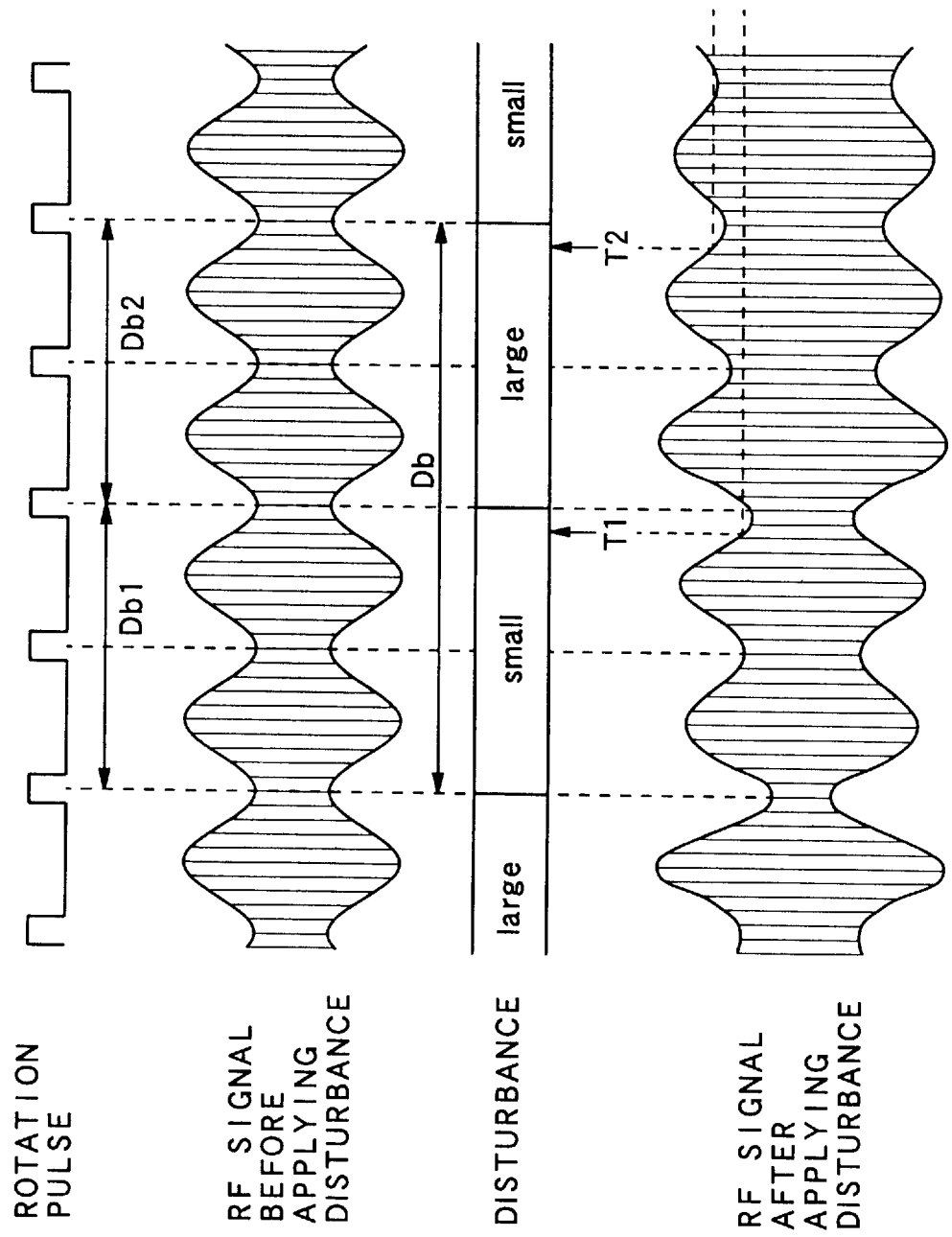
FIG. 18 is a chart showing a relationship on a time base between an external disturbance, which is applied onto the driving voltage of the liquid crystal panel and which is synchronized with the rotation cycle of the optical disc, the RF signal before applying the external disturbance and the RF signal after applying the external disturbance, in the third embodiment.

Therefore, as shown in FIG. 18, if the optical disc rotates by 4 rotations during the cycle Db of the external disturbance, i.e., if the tilt servo controlling apparatus is constructed such that the rotation cycle of the optical disc is an even number times of the cycle of the external disturbance, the RF amplitude level while applying the external disturbance in the "large" direction (at the time T2)is smaller than that while applying the external disturbance in the "small" direction (at the time T1), so that it is possible to judge which one of the two kinds of the external disturbances makes the RF amplitude level larger.

This is because, different from the case of FIG. 17, the wave form of the RF signal in synchronization with the rotation of the optical disc before applying the external disturbance while applying the external disturbance in the "small" direction (in the duration Da1) and that while applying the external disturbance in the "large" direction (in the duration Da2) are coincident with each other, to that the comparison of the RF amplitude levels due to the two kinds of the external disturbances can be performed under the same condition.

More concretely, at the steps S15 and S16 in the flow chart 16, for example, the predetermined number of the pulses, each of which is outputted per one rotation of the optical disc, may be counted respectively, and then the operational flow branches to the next steps S4 and S7.

Therefore, by constructing the tilt servo controlling apparatus such that the rotation cycle of the optical disc becomes an even number times of the cycle of the external disturbance, it is possible to precisely judge which one of the two kinds of the external disturbances makes the RF amplitude level larger when applying the two kinds of the external disturbances to the driving voltage for the liquid crystal panel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A tilt servo controlling apparatus comprising:

an optical pickup for emitting a light beam onto an optical record medium and detecting a reflection light from the optical record medium to thereby output a detection signal;

a level detecting device for detecting a level of the detection signal outputted by said optical pickup;

a tilt error correcting device for correcting a tilt error due to an aberration, which is generated by a tilt angle between (i) a normal line of a surface of the optical record medium at a position irradiated with the light beam and (ii) an optical axis of the light beam; and a tilt error correction controlling device for outputting a control signal to control a correction amount of said tilt error correcting device, by giving a variation to the control signal on a time base and adjusting the control signal so that the level detected by said level detecting device be optimized with respect to the variation of the control signal.

2. A tilt servo controlling apparatus according to claim 1, wherein said tilt error correction controlling device generates two kinds of disturbances as the control signal, compares levels with each other which are detected by said level detecting device in correspondence with the two kinds of disturbances, and increases or decreases the control signal by a predetermined amount so that the level detected by said level detecting device approaches a maximum value thereof.

3. A tilt servo controlling apparatus according to claim 1, wherein said tilt error correcting device comprises a liquid crystal panel disposed on an optical axis of the light beam for correcting an aberration, and said tilt error correction controlling device outputs the control signal as a driving signal for said liquid crystal panel.

4. A tilt servo controlling apparatus according to claim 3, wherein a surface area of said liquid crystal panel is divided into three areas of an inner circumference side area, a center area and an outer circumference side area with respect to a radial direction of an optical disc as the optical record medium, so that said liquid crystal panel be driven by the control signal for each of the three areas independently from each other.

5. A tilt servo controlling apparatus according to claim 3, wherein the control signal of said tilt error correction controlling device is limited so that a width of the variation of the control signal may not exceed a predetermined upper limit.

6. A tilt servo controlling apparatus according to claim 3, further comprising a temperature detecting device for detecting an ambient temperature of said liquid crystal panel, said tilt error correction controlling device changing a frequency of the control signal on the basis of the ambient temperature detected by said temperature detecting device.

7. A tilt servo controlling apparatus according to claim 1, wherein said level detecting device comprises an AGC (Automatic Gain Control) amplifier for controlling a level of the detection signal outputted by said optical pickup to be constant, and a gain control signal of said AGC amplifier is used as the level of the detection signal outputted by said optical pickup.

8. A tilt servo controlling apparatus according to claim 1, further comprising a frequency signal generating device for generating a frequency signal in synchronization with a rotation of a spindle motor for rotating the optical record medium, said tilt error correction controlling device controlling a timing of generating the control signal on the basis of the frequency signal generated by said frequency signal generating device.

9. A tilt servo controlling apparatus according to claim 1, wherein a frequency of the control signal is set by said tilt error correction controlling device such that an even number times of the frequency of the control signal is synchronized with a rotation cycle of a spindle motor for rotating the optical record medium.

* * * * *